United States Patent [19]
Matsui

[11] Patent Number: 5,909,416
[45] Date of Patent: Jun. 1, 1999

[54] LAND/GROOVE DETECTING METHOD AND APPARATUS FOR AN OPTICAL DISK

[75] Inventor: Tsutomu Matsui, Tokyo, Japan

[73] Assignee: NEC Corporation, Tokyo, Japan

[21] Appl. No.: 08/971,958

[22] Filed: Nov. 17, 1997

[30] Foreign Application Priority Data

Nov. 15, 1996 [JP] Japan .................................. 8-304436

[51] Int. Cl.⁶ .................................................. G11B 7/09
[52] U.S. Cl. .................................... 369/44.41; 369/44.37; 369/54
[58] Field of Search ........................... 369/54, 58, 44.26, 369/44.23, 44.41, 44.29, 44.27, 44.37, 44.28, 44.34

[56] References Cited

U.S. PATENT DOCUMENTS

| | | | |
|---|---|---|---|
| 5,459,705 | 10/1995 | Matoba et al. | 369/44.28 |
| 5,504,725 | 4/1996 | Katsumata | 369/44.28 |
| 5,734,634 | 3/1998 | Ono et al. | 369/44.26 |
| 5,757,746 | 5/1998 | Matsui | 369/44.28 |
| 5,784,347 | 7/1998 | Miyamoto et al. | 369/54 |
| 5,828,634 | 10/1998 | Ohno et al. | 369/44.26 |

FOREIGN PATENT DOCUMENTS

| | | |
|---|---|---|
| 4-57219 | 2/1992 | Japan . |
| 4-103315 | 9/1992 | Japan . |

OTHER PUBLICATIONS

Atsushi Saito et al., "1/8 Track Pitch Positioning Method for Optical Disk Drive", *The Journal of the Institute of Electronics Information and Communication Engineers, Autumn Convention*, C–384, Oct. 1994.

*Primary Examiner*—Thang V. Tran
*Attorney, Agent, or Firm*—Foley & Lardner

[57] ABSTRACT

The invention relates to a technique to detect lands and grooves formed on an optical disk, and is intended to provide a land/groove detecting apparatus capable of steadily obtaining track detection signals and land/groove detection signals. According to the invention, +1-, 0- and −1-order light beams obtained from a three-beam type optical head are received by a 6-divided optical sensor, and the 0-order beam is detected by optical sensor elements a, b, c and d of a 4-divided optical sensor while the +1- and −1-order beams are detected by two optical sensor elements e and f, respectively, on the two sides of the 4-divided optical sensor. The output signals of the optical sensor elements a, b, c, d, e and f are denoted by A, B, C, D, E and F, respectively. As a tracking error signal and a land/groove detection signal are calculated by equations TE=E−F and LG=(2×(A+B+C+D)−(E+F)), the land/groove detection signal LG is held at a zero cross point of the tracking error signal TE, and whether getting on a track has taken place on a land or on a groove is determined according to a polarity of the held land/groove detection signal LG, stable tracking error signals and land/groove detection signals can be obtained.

12 Claims, 13 Drawing Sheets

54 SIGNAL PROCESSING UNIT

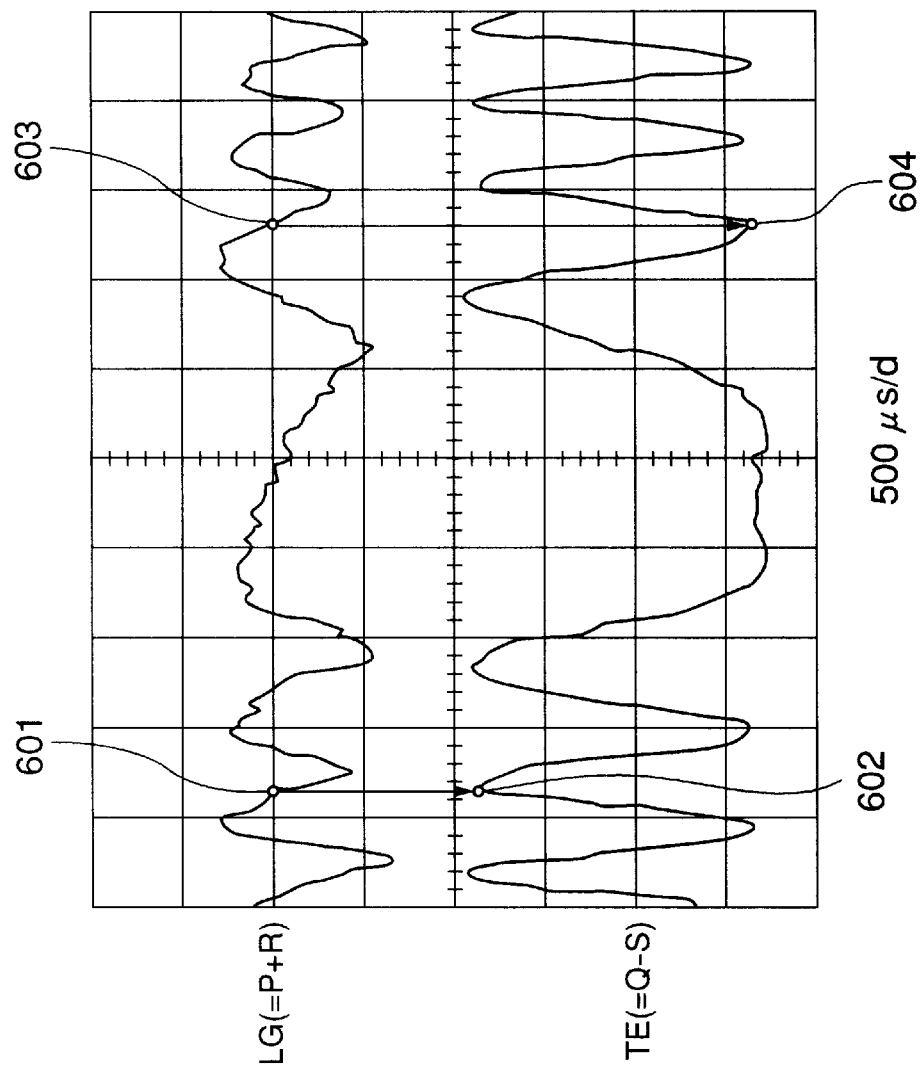

LAND/GROOVE DETECTING METHOD AND APPARATUS FOR AN OPTICAL DISK

FIELD OF THE INVENTION

The present invention relates to a technique to detect lands and grooves formed on an optical disk, and more particularly to a land/groove detecting apparatus capable of reliable track detection for land/groove records.

DESCRIPTION OF THE PRIOR ART

An effective way to increase density of an optical disk in the radial direction is known to be land/groove recording, i.e. recording of data not only on a groove track formed on the optical disk but on a land part next to the groove track. In a drive apparatus for such land/groove-recorded optical disks, a key for stable tracking is whether to track on the land or on the groove for random access to a desired position on the disk.

The Gazette JP B2 63-57859 (Japanese Patent Publication of Nov. 14, 1988) discloses a technique, applicable to land/groove record/playback apparatuses, to keep width of the land and width of the groove not greater than a diameter of a laser beam and thereby stably realize land/groove during recording/reading.

FIGS. 7A through 7C illustrate the configuration of a land/groove detecting apparatus according to the prior art, which will be described below with reference to these diagrams.

This land/groove detecting apparatus according to the prior art is provided with an optical head 50 for irradiating an optical disk 48 with a laser beam L and obtaining the resultant reflected beam shown in FIG. 7A by arrows, a 4-divided optical sensor 52 and a signal processing unit 54 for calculating a tracking error signal TE and a land/groove detection signal LG from the output signal of the 4-divided optical sensor 52, as shown in FIG. 7B. A land/groove detecting unit 55 is shown in FIG. 7C.

The optical head 50 is a one-beam type. The laser beam L emitted from a laser beam source 501 is converted into a parallel beam by a collimator lens 502, transmitted straight by a polarizing beam splitter 503 as a P wave, polarized by 90° by a 45° mirror 504, transmitted by a ¼ wavelength plate 505 and an objective lens 506, and irradiates an optical disk 48. The reflected beam from the optical disk 48 is converted into a circularly polarized beam circulating in a direction reverse to the beam irradiating the optical disk 48, and returns to the ¼ wavelength plate 505 to become a polarized plane of the reflected beam being normal to a polarized plane of the incident light beam at the ¼ wavelength plate 505. Then the linear polarize:. beam is polarized by 90° by the polarizing beam splitter 503, and received by the 4-divided optical sensor 52 via a focusing lens 507 and a cylindrical lens 508.

The 4-divided optical sensor 52 consists of optical sensor elements p, q, r and s, which together from a spot S0 as illustrated in FIG. 7B. Against the beam returning from the optical disk 48, the optical sensor elements p and r are disposed in a direction parallel to the track, and the optical sensor elements q and s, in a direction normal to the track. Output signals of the optical sensor elements p, q, r and s are denoted by P, Q, R and S, respectively. The signal processing unit 54 obtains a tracking error signal TE, representing the deviating direction of tracking, i.e. a quantity of tracking error, from the difference in reflected light intensity in the direction normal to the track, i.e. a sign and magnitude of the difference between the output signals Q and S via a differential amplifier 541. A land/groove detection signal LG indicating whether the detected position is on the land of the track, where a quantity of reflected light is greater, or on the groove, where the quantity of reflected light is smaller. The signal LG represents the magnitude of the sum of the reflected light intensity in the direction parallel to the track, i.e. a sum of the output signals P and R via a summing amplifier 542.

FIG. 7C illustrates the configuration of the land/groove detecting unit 55 in the prior art land/groove detection apparatus. The tracking error signal TE and the land/groove detection signal LG, obtained as shown in FIG. 7B, are supplied to the land/groove detecting unit 55. The land/groove detection signal LG is supplied to an upper side peak detecting circuit 551 and a lower side peak detecting circuit 552, which respectively output the upper and lower peak values of the land/groove detection signal LG. These peak values are supplied to and averaged by an averaging circuit 553. The average of these peak values is supplied to the reference input of a zero cross detecting circuit 554, which outputs a gate signal when the land/groove detection signal LG crosses a zero cross point. The gate signal is supplied to the gate of a sample/hold (S/H) circuit 555, which holds the tracking error signal TE when the land/groove detection signal LG crosses at the zero cross point. This held tracking error signal TE is supplied to a polarity detecting circuit 556, which gives a land/groove detecting output, according to whose polarity it is judged whether getting on the track is taking place on the land or on the groove.

FIG. 8 illustrates the waveforms of the tracking error signal TE and the land/groove detection signal LG in the prior art land/groove detection apparatus. The following description refers to FIGS. 7A through 7C and 8.

As the land/groove detection signal LG is an output representing the light intensity resulting from mere addition of the output signals P and R. The output signals have no zero cross point and, therefore, with reference to them the timing of sample/hold cannot be detected. Accordingly, the upper and lower limits of the land/groove detection signal LG are constantly detected by the peak detecting circuits 551 and 552, respectively, and a sample/hold timing based on artificial zero crossing is extracted by assuming the intermediate level between the upper and lower peaks to be equivalent to a zero cross point. For instance, as the sample/hold value 602 of the tracking error signal TE is positive, i.e. the quantity of reflected light is large, at an artificial zero cross point 601 of a downward phase of the land/groove detection signal LG in FIG. 8, the timing of getting on the track on the land at this point of time is obtained. Similarly, as the sample/hold value 604 of the tracking error signal TE is negative, i.e. the quantity of reflected light is small, at an artificial zero cross point 603 of a downward phase of the land/groove detection signal LG in FIG. 8, the timing of getting on the track on the groove at this point of time is obtained.

However, the prior art land/groove detection apparatus involves the following problems.

First, depending on the land/groove width ratio or groove depth of the optical disk 48, the timing of getting on the track cannot be detected when the phase difference between the tracking error signal TE and the land/groove detection signal LG approaches zero.

Second, the tracking error signal TE is susceptible to a substantial tracking offset depending on the inclination or eccentricity of the optical disk 48, leading to instability of the phase difference of sample/hold between the land/groove detection signal LG and the tracking error signal TE, which would make it impossible to accurately detect the timing of getting on the track.

Third, as the land/groove detection signal LG is provided to extract at an artificial zero cross point as stated above. However, if there is a drop-out during recording or reading from the optical disk 48 or unevenness of film formation, it is impossible to determine the zero cross point of land/groove detection signal LG, and accordingly to accurately detect the timing of getting on the track.

SUMMARY OF THE INVENTION

The object of the present invention is to provide a land/groove detection apparatus capable of steadily obtaining tracking error signals and land/groove detection signals.

In order to solve the aforementioned problems, the present invention has made land/groove detection fully reliable by using a three-beam type optical head. Means to solve the problems is described below.

(a) A 6-divided optical sensor, consisting of a 4-divided optical sensor in the center and two optical sensor elements, arranged on the two sides of the 4-divided optical sensor, receives +1-order, 0-order and −1-order light beams obtained from a three-beam type optical head. In this process, optical sensor elements a, b, c and d of the 4-divided optical sensor detects the 0-Order beam, and the optical sensor elements e and f detect the +1-order and −1-order beams, respectively. Here, the output signals of the optical sensor elements a, b, c, d, e and f are denoted by A, B, C, D, E and F, respectively. A tracking error signal is calculated by (E−F), and a land/groove detection signal, by (2×(A+B+C+D)−(E+F)).

(b) In the above described process (a), the level of the land/groove detection signal is held at a zero cross point of the tracking error signal, and whether getting on the track has taken place on the land or on the groove is judged by determining whether the held land/groove detection signal is positive or negative.

(c) In the above-described process (a), the level of the tracking error signal is held at a zero cross point of the land/groove detection signal, and whether getting on the track has taken place on the land or on the groove is judged by determining whether the held tracking signal is positive or negative.

(d) In the above-described process (a), when the optical head is to be moved in the radial direction of the optical disk under no tracking control, the elements of the 4-divided optical sensor are divided by dividing lines parallel to the array of +1-order, 0-order and −1-order light beams detected by the 6-divided optical sensor, and the tracking error signal is detected in a push-pull method from 0-order light beam.

BRIEF DESCRIPTION OF THE DRAWINGS

FIG. 8 is a waveform diagram of a tracking error signal TE and a land/groove detection signal LG in the prior art land/groove detection apparatus.

DETAILED DESCRIPTION OF THE PREFERRED EMBODIMENTS

Figure 1A:
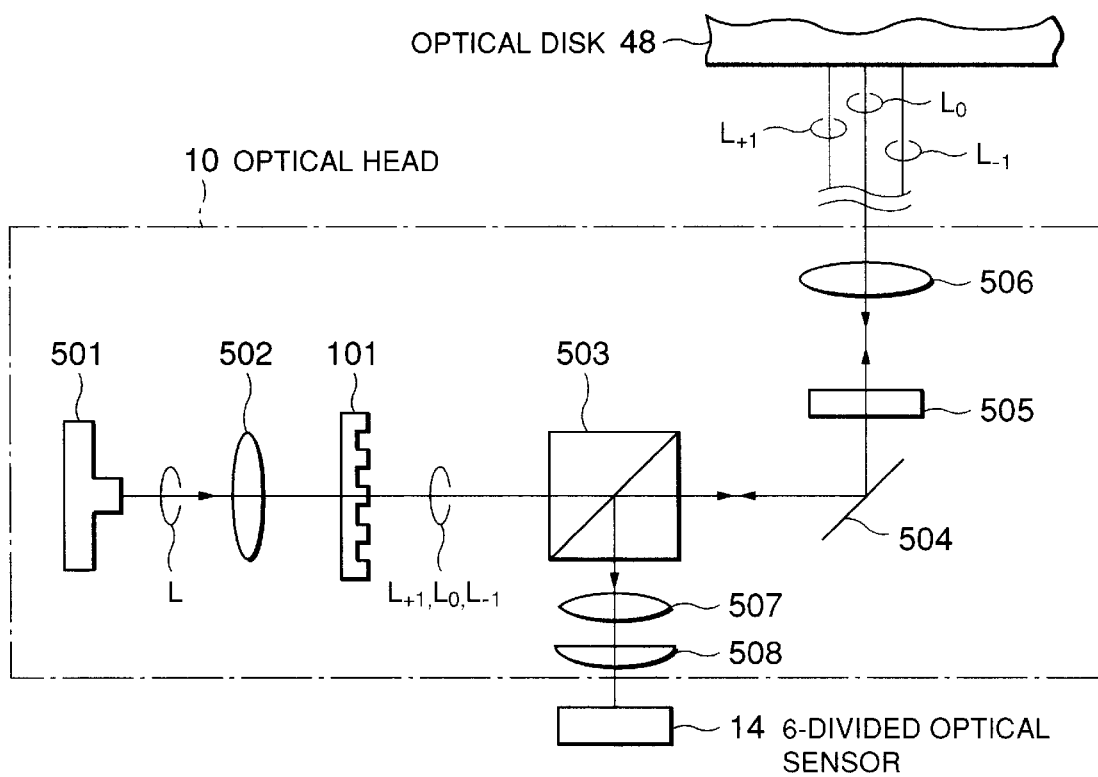
FIG. 1A is a block diagram of a preferred embodiment of an optical head and a 6-divided optical sensor of a land/groove detection apparatus according to the present invention.
Figure 1B:
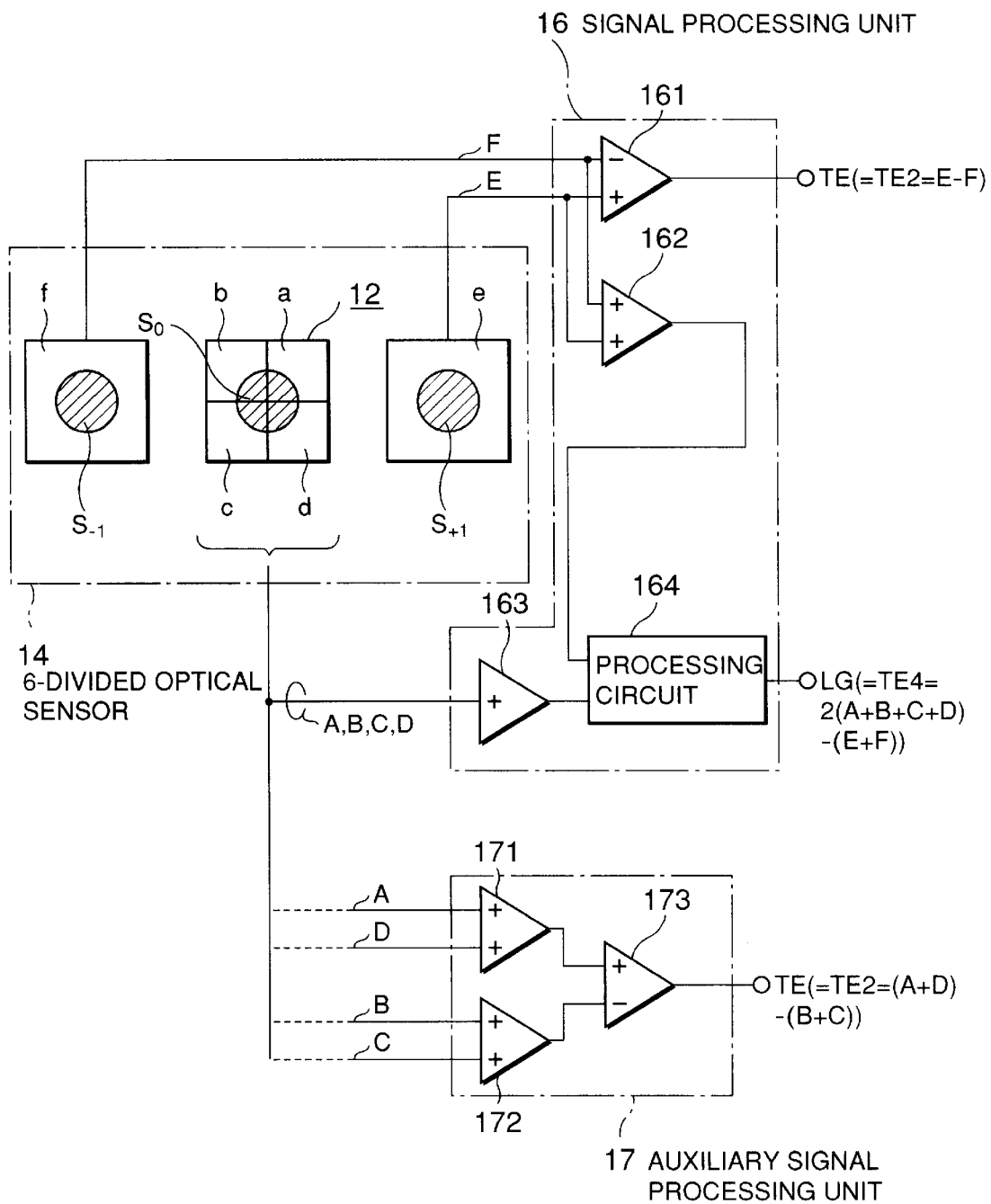
FIG. 1B is a block diagram of a preferred embodiment of a 6-divided optical sensor and a signal processing unit of a land/groove detection apparatus according to the invention.
Figure 1C:
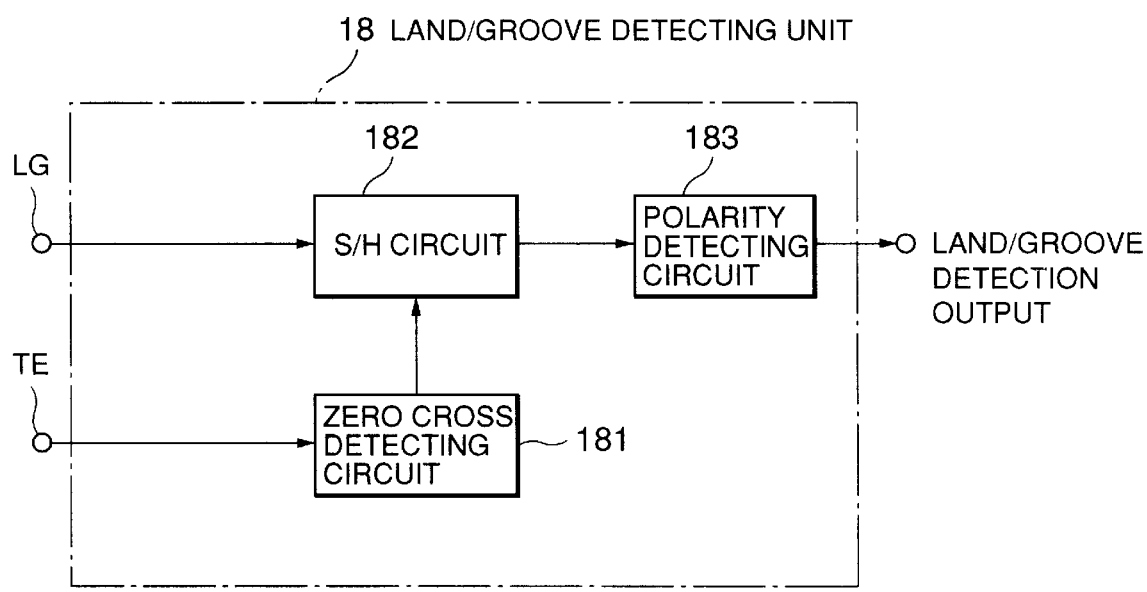
FIG. 1C is a block diagram of a land/groove detecting unit of a land/groove detection apparatus according to the invention.
Figure 7A:
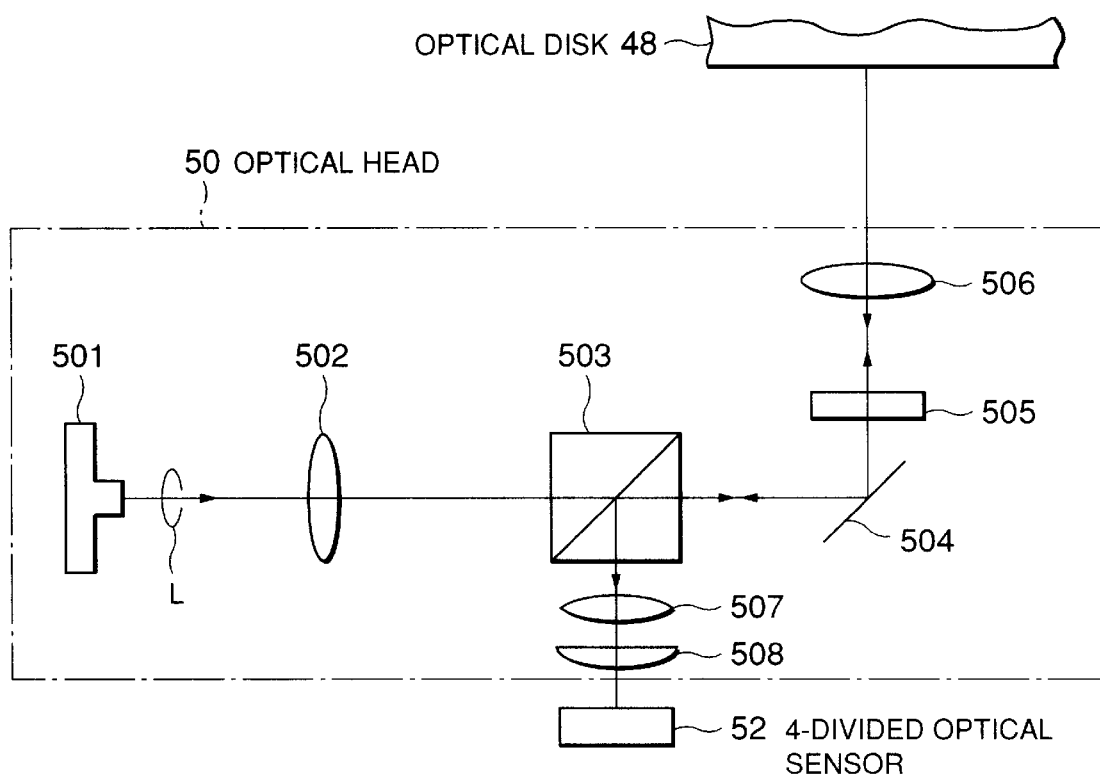
FIG. 7A is a block diagram of an optical head and a 4-divided optical sensor of a land/groove detection apparatus according to the prior art.
Figure 7B:
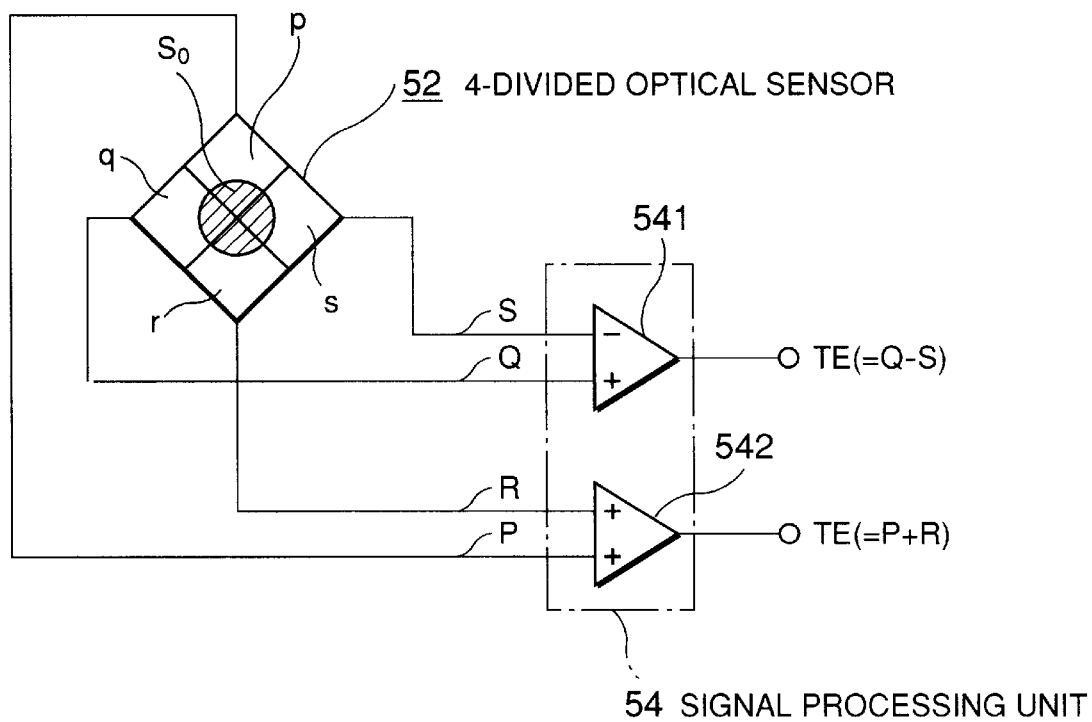
FIG. 7B is a block diagram of a 4-divided optical sensor and a signal processing unit of a land/groove detection apparatus according to the prior art.
Figure 7C:
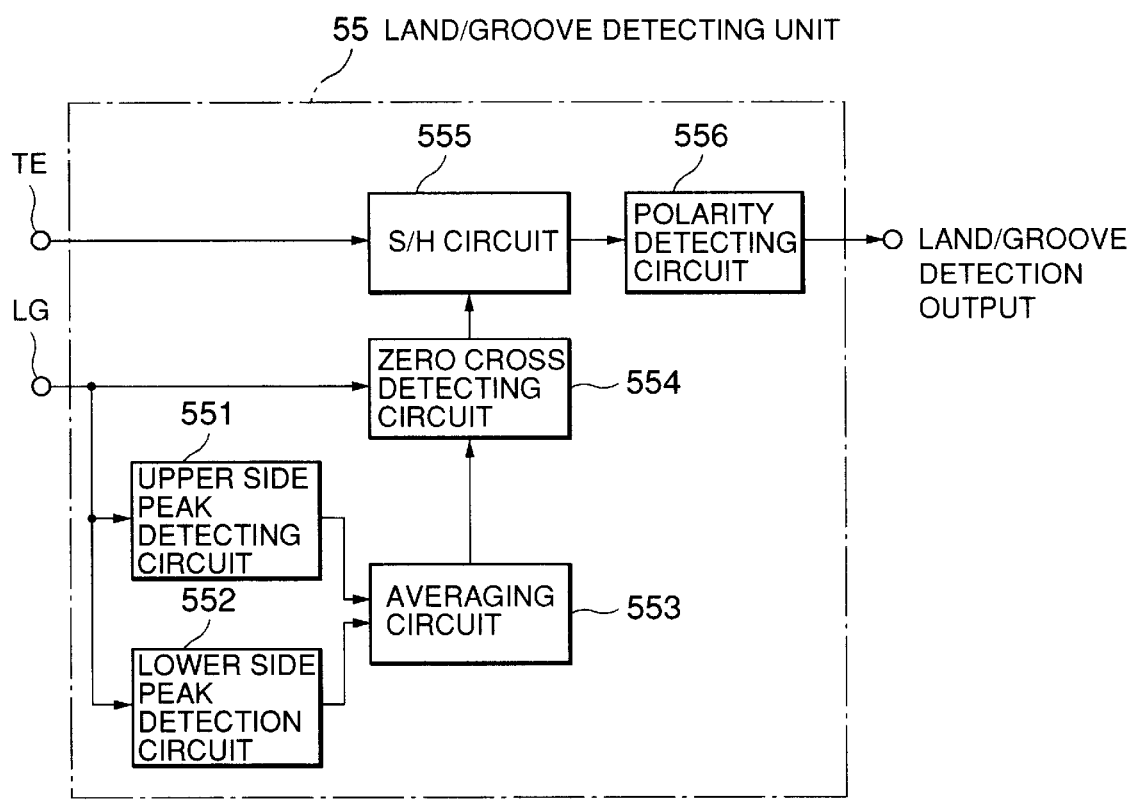
FIG. 7C is a block diagram of a land/groove detecting unit of a land/groove detection apparatus according to the prior art.

FIGS. 1A through 1C illustrates the configuration of a land/groove detection apparatus, which is a preferred embodiment of the present invention. The same constituent parts as in FIGS. 7A through 7C are assigned the same reference signs to avoid duplication of description.

This land/groove detection apparatus is provided with a three-beam optical head 10 for irradiating an optical disk 48 with +1 -order, 0 -order and −1-order light beams L+1, L−0 and L−1 and obtaining the resultant reflected light beams; a 6-divided optical sensor 14, and a signal processing unit 16. The sensor 14 consists of a 4-divided optical sensor 12 in the center and two optical sensor elements e and f, arranged on the two sides of the 4-divided optical sensor 12; and a signal processing unit 16 calculates tracking error signals TE and a land/groove detection signal LG from the output signals of the 6-divided optical sensor 14.

A laser beam emitted from a laser beam source 501 is converted into a parallel beam by a collimator lens 502 and further into the three beams L+1, L0 and L−1 by a diffraction grating 101. The beams L+1, L0 and L−1 are transmitted straight by a polarizing beam splitter 503 as a p wave, polarized by 90° by a 45° mirror 504, transmitted by a ¼ wavelength plate 505 and an objective lens 506, and irradiates the optical disk 48. The reflected beam from the optical disk 48 is converted into a circularly polarized beam circulating in a direction reverse to the beam irradiating the optical disk 48, returns to the ¼ wavelength plate 505 to become a polarized plane of the reflected beam being normal to a polarized plane of the incident light beam at the ¼ wavelength plate 505, and is polarized by 90° by the polarizing beam splitter 503, and received by the 6-divided optical sensor 14 via a focusing lens 507 and a cylindrical lens 508.

In the 4-divided optical sensor 12, consisting of optical sensor elements a, b, c and d arranged clockwise from top right, a spot S0 by the 0-order L0 beam is formed as illustrated. In the optical element e, a spot S+1 is formed by the +1-order beam L+1. In the optical element f, a spot S−1 is formed by the −1 -order beam L−1. Against this beam returning from the optical disk 48, the optical sensor elements a and c are disposed in a direction parallel to the track (tangential direction), the optical sensor elements b and c are disposed in a direction parallel to the track (tangential direction), and the optical elements e and f, at a distance from others. The output signals representing light intensities of the optical sensor elements a, b, c, d, e and f are denoted by A, B, C, D, E and F, respectively.

In the signal processing unit 16, tracking error signal TE is obtained from the output signals E and F via a differential amplifier 161, as well as a land/groove detection signal LG from the output signals A, B, C, D, E and F via summing amplifiers 162 and 163 and an processing circuit 164.

Here is described the principle of the positioning method for light spots out of the principles to calculate the tracking error signal TE and the land/groove detection signal LG. This principle of the positioning method for light spots has been learned from Atsushi Saito et al., "1/8 Track Pitch Positioning Method for Optical Disk Drive", The Journal of the Institute of Electronics Information and Communication Engineers, Autumn Convention, C-384, October 1994. First, positioning a light spot at a 1/8 track pitch requires a four-phase tracking error signal, which is defined by the following four equations. Parenthesized output signals in the equations represent normalized values. Thus, as the luminous energy ratio between the 0-order beam and the ±1-order beam is 5:1 to 7:1, TE4 is obtained with a corrected value resulting from the normalization of this luminous energy ratio.

Tracking error signal $TE1=E-(A+B+C+D)$ .... (1)

Tracking error signal $TE2=E-F$ .... (2)

Tracking error signal $TE3=(A+B+C+D)-F$ .... (3)

Land/groove detection signal $TE4=2\times(A+B+C+D)-(E+F)$ .... (4)

As the light spots S−1, S0 and S1 pass three bits which differ in position by a 1/4 track pitch each in the radial direction of the disk 48, the solutions to TE1 through TE3 are obtained at 1/8 track pitch intervals in the radial direction of the disk 48. The solution to the land/groove detection signal TE4 depends on the light spot diameter and the track pitch, and is susceptible to a detection error if the waveforms of the signals A through F deviate from the sine wave.

Whereas the technique described in the above-cited reference only discloses a method to calculate tracking error signals, the present invention is an adaptation of this technique, and a method of its specific application to real three-beam type optical heads is disclosed here.

As the invention uses a three-beam type optical head, the returning light beam is turned by 90° by the 1/4 wavelength plate 505 and reaches the 6-divided optical sensor 14.

The tracking error signal TE1 is a difference between a +1-order light component and a 0-order light component (S+1−S0); the tracking error signal TE2, a difference between the +1-order light component and a −1-order light component (S+1−S−1); and the tracking error signal TE3, a difference between the 0-order light component and the −1-order light component (S0−S−1). TE2, whose variations are the greatest,-is taken up here, and it is defined that the tracking error signal TE=TE2.

The land/groove detection signal TE4, which equals (2S0−(S+1−S−1)), represents the difference between a present position (S0) and two positions adjoining thereto in the radial direction (S+1, S−1). When the present position (S0) is on the land, where there is more reflected light, and the adjoining positions (S+1, S−1) are on the groove, where there is less reflected light, TE4 takes on a positive value, and in the reverse case, it takes on a negative value. Here the land/groove detection signal LG is defined to be equal to TE4.

FIG. 1C illustrates the land/groove detecting unit 18 of the land/groove detection apparatus according to the invention. The tracking error signal TE and the land/groove detection signal LG, obtained as shown in FIG. 1B, are provided for the land/groove detecting unit 18. The tracking error signal TE is provided for a zero cross detecting circuit 181, which outputs a gate signal when the tracking error signal TE crosses a zero cross point. The gate signal is provided for the gate of a sample/hold (S/H) circuit 182, which holds the land/groove detection signal LG at the time the tracking error signal TE is at the zero cross point. This held land/groove signal LG is provided for a polarity detecting circuit 183, which gives a land/groove detection output. According to the polarity of this land/groove detection output, it is judged whether getting on the track has taken place on the land or on the groove.

Figure 2:
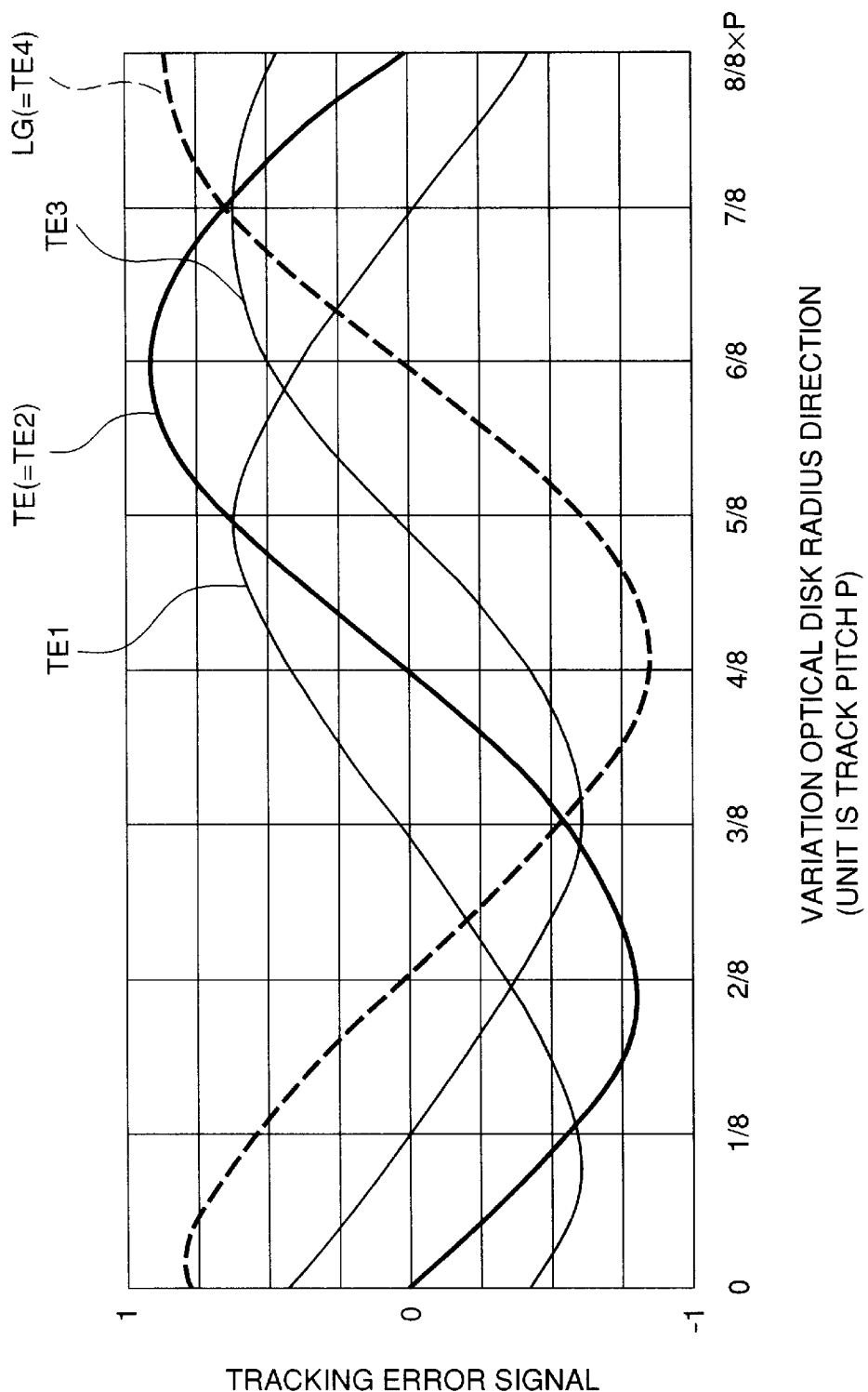
FIG. 2 is a waveform diagram showing the relationship between the variation in the radial direction of the optical disk and tracking error signals according to the invention.

FIG. 2 is a waveform diagram showing the relationship between the variation in the radial direction of the optical disk 48 and tracking error signals according to the invention.

Figure 3:
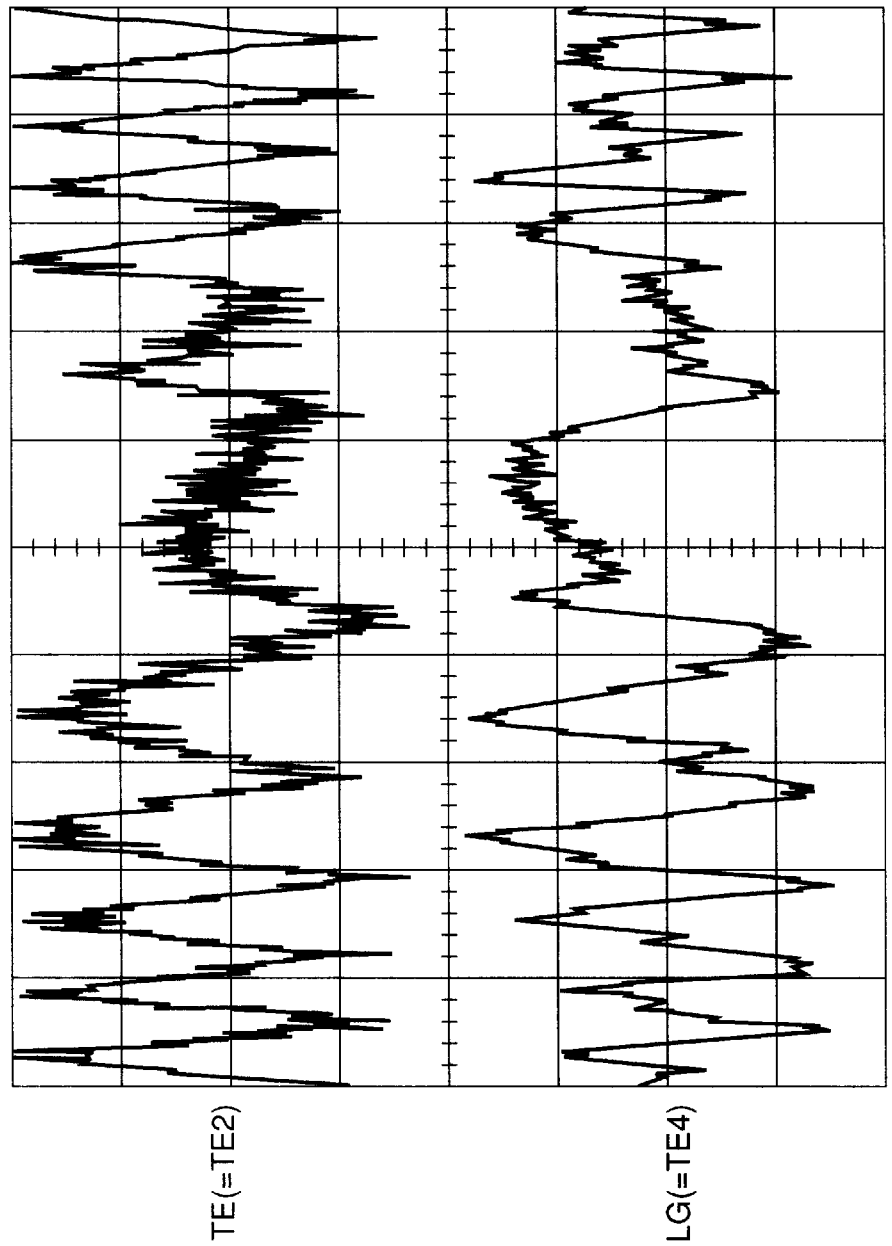
FIG. 3 is a waveform diagram showing a tracking error signal according to the invention.
Figure 4:
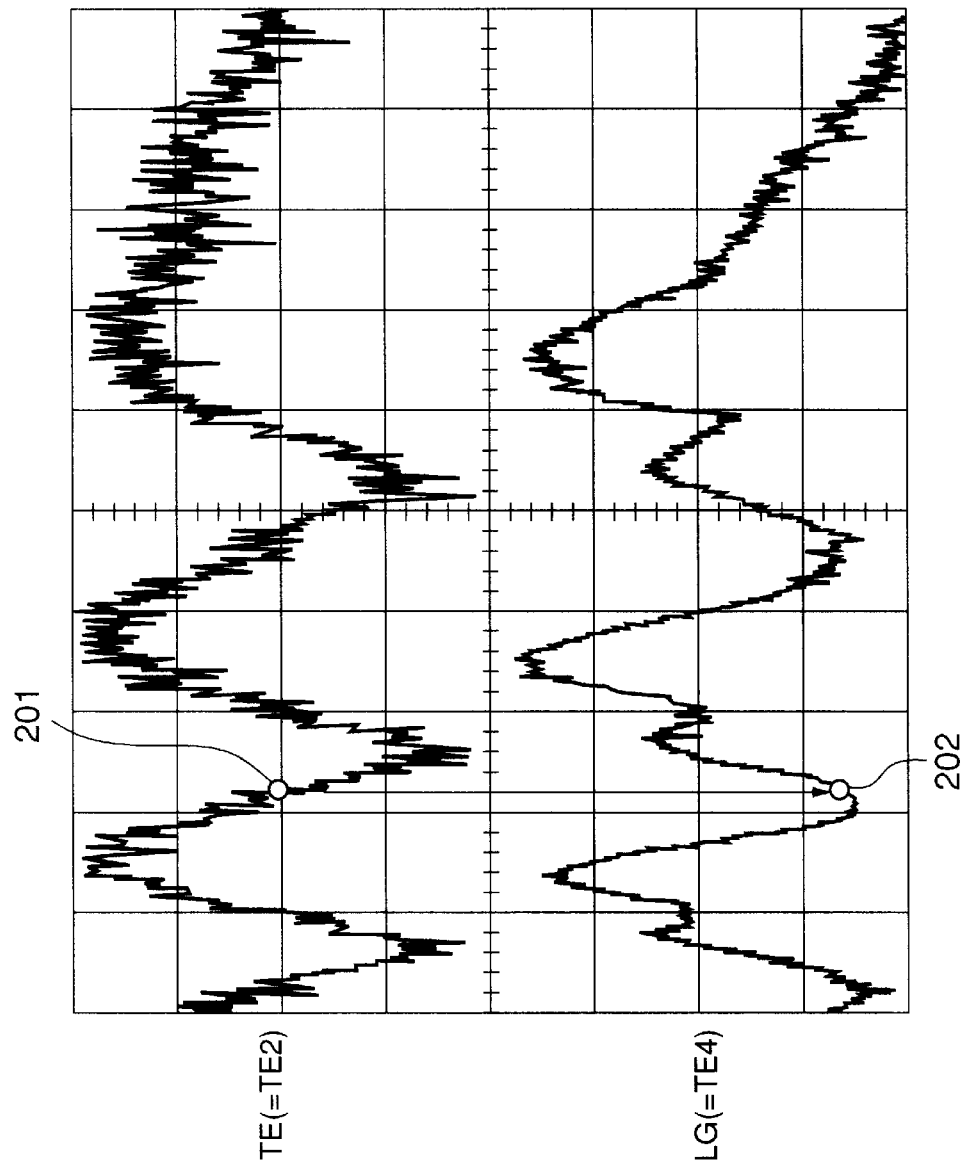
FIG. 4 is a waveform diagram showing a tracking error signal according to the invention.
Figure 5:
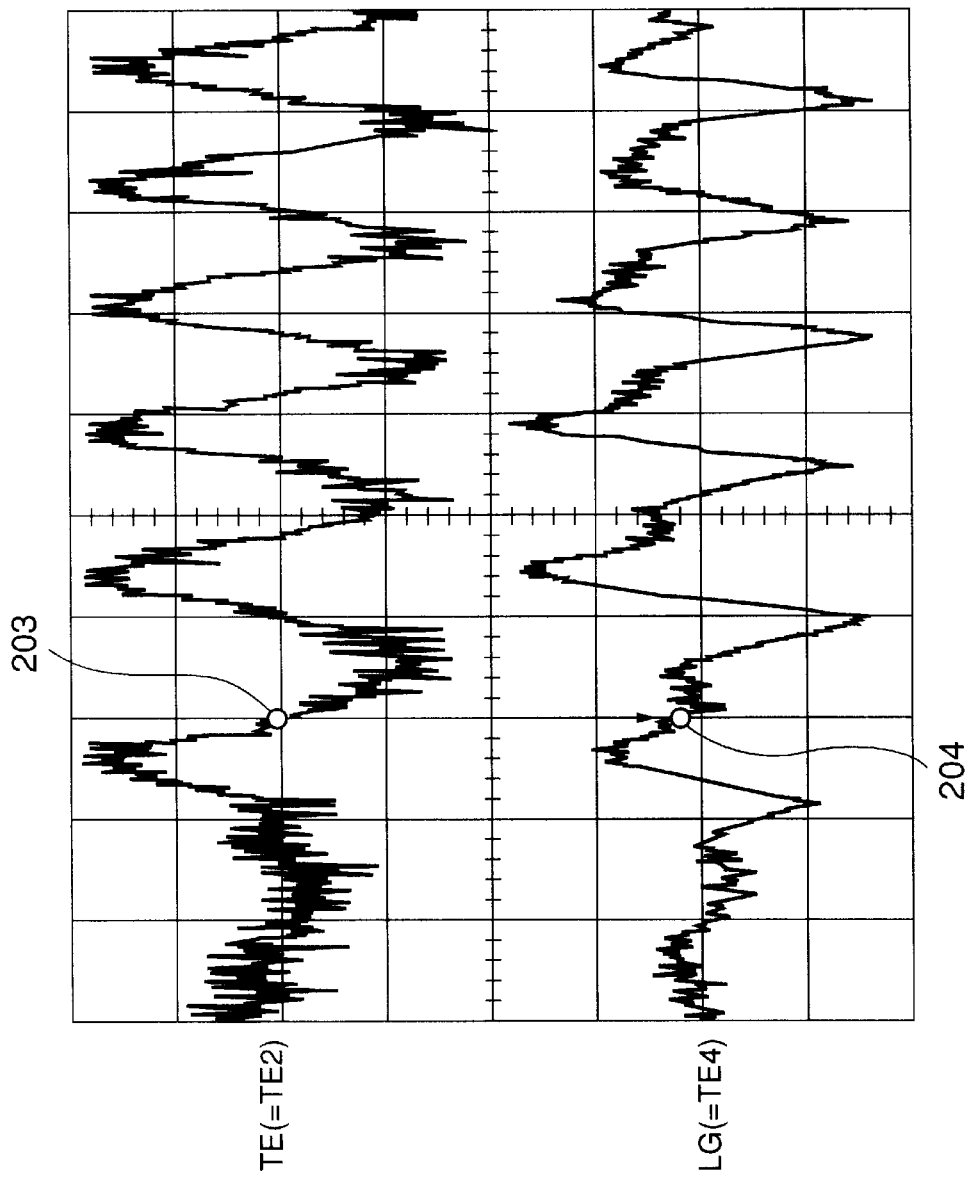
FIG. 5 is a waveform diagram showing a tracking error signal according to the invention.

FIG. 2 illustrates output variations of TE and LG at one-track pitch at normalized ±1. As there is a 90° phase difference between the signal waveforms of these TE and LG, it is possible to judge in which way the tracking has deviated from the radial direction of the optical disk 48. Examples of directional detection of this tracking deviation from the radial direction are shown in FIGS. 3 through 5, which are waveform diagrams of tracking error signals in the implementation of the invention. The left part of FIG. 3 constitutes FIG. 4, and the right part of same, FIG. 5.

Referring to FIG. 4, when the land/groove detection signal LG is held by the sample/hold (S/H) circuit 182 at the zero cross point in a downward phase of the tracking error signal TE detected by the zero cross detection circuit 181, LG takes on a negative value. For instance, if an arrow is drawn downward from a zero cross point 201 of TE, the value of LG at a point 202 is held. As the polarity detection circuit 183 determines the polarity of this held LG to be negative, the zero cross point, i.e. the servo pull-in point, of the tracking error signal TE is found to be on the land of the track.

Referring to FIG. 5, when the land/groove detection signal LG is held by the sample/hold (S/H) circuit 182 at the zero cross point in another downward phase of the tracking error signal TE detected by the zero cross detection circuit 181, LG takes on a positive value. For instance, if an arrow is drawn downward from a zero cross point 203 of TE, the value of LG at a point 204 is held. As the polarity detection circuit 183 determines the polarity of this held LG to be positive, the zero cross point, i.e. the servo pull-in point, of the tracking error signal TE is found to be on the groove of the track.

Incidentally, the tracking error signal TE (=TE2) in a configuration where a three-beam type optical head is used can be obtained not only from Equation (2) but also from the following Equation (5) referring to the optical sensor elements a, b, c and d of the 4-divided optical sensor, on which a 0-order light beam comes incident.

Tracking error signal $TE2=(A+D)-(B+C)$ .... (5)

Incidentally, the reason why the value of the tracking error signal TE is calculated not from (A+B) (D+C) but by subtraction in the orthogonal direction as the Equation (5), in spite of the array of optical sensor elements e, abcd and f in the order of +1-order light, 0-order light and −1-order light, is related to the three-beam type detection of focusing error signals. Thus it is because, whereas the three beams run straight toward e, abcd and f in the focusing optical axis system of the focusing lens 507 and the cylindrical lens 508 on the optical axis when a focusing error signal is detected from the returning light from the optical disk 48 astigmatically by using a focusing lens 507, the cylindrical lens 508 and a ¼ wavelength plate 505, the focused beam itself of each of the +1-, 0- and −1-order lights is turned by 90° by the ¼ wavelength plate 505 and lands on the 6-divided optical sensor 14.

Figure 6A:
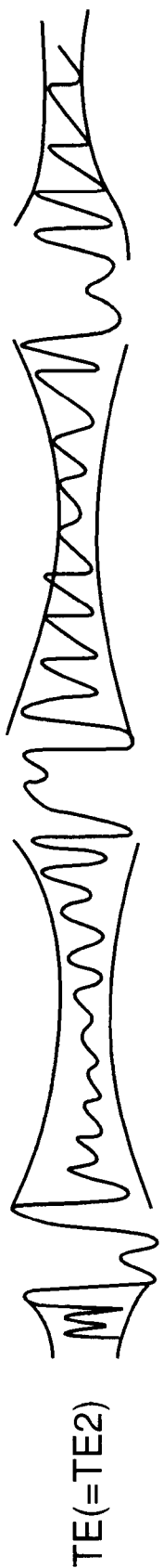
FIG. 6A is a waveform diagram showing a tracking error signal TE2 according to the invention.
Figure 6B:
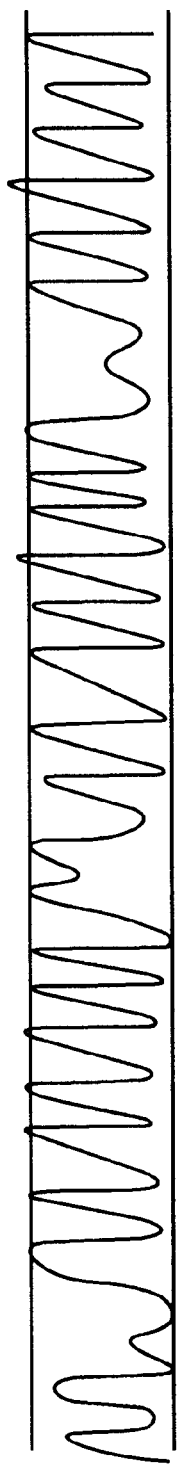
FIG. 6B, a waveform diagram showing a tracking error signal TE1 according to the invention.

On the tracking error signal TE (=TE2) in this three-beam type configuration, the high-frequency tracking error signal TE deteriorates in optical resolving power in the radial direction of the optical disk 48 as shown in FIG. 6A, as the +1- and −1-order light beams deviate from the track both ways from the radial direction of the optical disk 48. In view of this problem, during usual tracking servo driving, the tracking error signal TE (=TE2) in the three-beam configuration is calculated from Equation (2) as shown in FIG. 6A and, for track counting at the time of high-speed access, the tracking error signal TE (=TE2) in a push-pull configuration is calculated from Equation (5). The tracking error signal TE from Equation (5) can provide more accurate track counting. More specifically, an auxiliary processing unit 17 consisting of summing amplifiers 171 and 172 and a differential amplifier 173, shown in FIG. 1B, calculates the tracking error signal TE during high-speed access.

Although the foregoing description referred to the determination of the polarity of the land/groove detection signal LG with reference to the zero cross point of the tracking error signal TE, the reverse is also applicable, i.e. referring to the determination of the polarity of the tracking error signal TE with reference to the zero cross point of the land/groove detection signal LG, because the phase difference between the tracking error signal TE and the land/groove detection signal LG is constantly 90 degrees.

Thus the present invention makes available stable tracking error signals and land/groove detection signals, ensures reliable track detection of land/groove records and, moreover, makes possible detection of any tracking deviation in the radial direction of the optical disk.

What is claimed is:

1. A land/groove detection method for an optical disk comprising:
   irradiating three beams of +1-, 0- and −1-orders from an optical head on an optical disk, track data of said optical disk being recorded on a land and on a groove of a track,
   receiving said +1-, 0- and −1-order beams reflected by said optical disk when said reflected 0-order beam is radially divided into four beams from the center, and detecting light intensities A and D in a direction parallel to said track; light intensities B and C in a direction parallel to said track; and light intensities E and F of said reflected +1- and −1-order beams, respectively, and
   calculating tracking error signal TE and land/groove detection signals LG as TE=(E−F) and LG=(2×(A+B+C+D)−(E+F), respectively.

2. A land/groove detection method for an optical disk, as claimed in claim 1, further comprising:
   holding said land/groove detection signal LG at a zero cross point of said tracking error signal TE; and
   judging whether said optical head is on said land or on said groove of said track from a polarity of said held land/groove detection signal LG.

3. A land/groove detection method for an optical disk, as claimed in claim 1, further comprising:
   holding said tracking error signal TE at a zero cross point of said land/groove detection signal LG; and
   judging whether said optical head is on said land or on said groove of said track from a polarity of said held tracking error signal TE.

4. A land/groove detection method for an optical disk, as claimed in claim 1, further comprising:
   calculating said tracking signal TE to be equal to ((A+D)−(B+C)), when said optical head moves in a radial direction of said optical disk without being accompanied by tracking control.

5. A land/groove detection apparatus for an optical disk comprising:
   a 6-divided optical sensor consisting of a 4-divided optical sensor, disposed in the center, for detecting said reflected 0-order light beam out of three beams of +1-, 0- and −1-orders irradiating and being reflected by an optical disk whose track data are recorded on and read from, both on a land and on a groove of a track, and two optical sensor elements, arranged on both sides of said 4-divided optical sensor, for detecting said reflected +1-order and −1-order light beams, respectively;
   signal processing means to calculate tracking error signals TE and land/groove detection signals LG as TE=(E−F) and LG=(2×(A+B+C+D)−(E−F)), respectively, where said A and said D denote output signals of said respective sensor elements for said light beam returning in a direction parallel to said track of said 4-divided optical sensor; said B and said C, output signals of said respective sensor elements for said light beam returning in a direction parallel to said track of said 4-divided optical sensor; and said E and said F, output signals of said two optical sensor elements beside said 4-divided optical sensor.

6. A land/groove detection apparatus for an optical disk, as claimed in claim 5, further comprising:
   sample/hold means for holding said land/groove detection signal LG at a zero cross point of said tracking error signal TE and
   signal processing means for determining whether said three beams are on said land or on said groove of said track from a polarity of said held land/groove detection signal LG.

7. A land/groove detection apparatus for an optical disk, as claimed in claim 5, further comprising:
   sample/hold means for holding said tracking error signal TE at a zero cross point of said land/groove detection signal LG and
   signal processing means for determining whether said three beams are on said land or on said groove of said track from a polarity of said held tracking error signal TE.

8. A land/groove detection apparatus for an optical disk, as claimed in claim 5, further comprising:
   auxiliary signal processing means for calculating, where said 6-divided optical sensor moves in a radial direction of said optical disk without being accompanied with tracking control, said tracking error signal TE to be equal to ((A+D)−(B+C)).

9. A land/groove detection method for an optical disk, as claimed in claim 2, further comprising:

calculating said tracking signal TE to be equal to ((A+D)−(B+C)), when said optical head moves in a radial direction of said optical disk without being accompanied by tracking control.

10. A land/groove detection method for an optical disk, as claimed in claim 3, further comprising:

calculating said tracking signal TE to be equal to ((A+D)−(B+C)), when said optical head moves in a radial direction of said optical disk without being accompanied by tracking control.

11. A land/groove detection apparatus for an optical disk, as claimed in claim 6, further comprising:

auxiliary signal processing means for calculating, where said 6-divided optical sensor moves in a radial direction of said optical disk without being accompanied with tracking control, said tracking error signal TE to be equal to ((A+D)−(B+C)).

12. A land/groove detection apparatus for an optical disk, as claimed in claim 7, further comprising:

auxiliary signal processing means for calculating, where said 6-divided optical sensor moves in a radial direction of said optical disk without being accompanied with tracking control, said tracking error signal TE to be equal to ((A+D)−(B+C)).

* * * * *